United States Patent [19]

Smith

[11] 4,278,235
[45] Jul. 14, 1981

[54] MALE ENDED VALVE

[76] Inventor: Peter W. Smith, 204 Engle St., Tenafly, N.J. 07670

[21] Appl. No.: 109,828

[22] Filed: Jan. 7, 1980

Related U.S. Application Data

[63] Continuation-in-part of Ser. No. 907,710, May 19, 1978, abandoned.

[51] Int. Cl.³ ............................................. F16K 51/00
[52] U.S. Cl. .................................... 251/144; 251/366; 285/286
[58] Field of Search ...................... 251/144, 329, 366; 285/189, 286

[56] References Cited

U.S. PATENT DOCUMENTS

| | | | |
|---|---|---|---|
| 3,003,601 | 10/1961 | Ott | 285/189 |
| 3,172,638 | 3/1965 | Grove | 251/329 |
| 3,197,175 | 7/1965 | Siepmann | 251/329 |
| 3,204,929 | 9/1965 | Bryant | 251/366 |
| 3,482,816 | 12/1969 | Arnold | 251/329 |
| 3,575,380 | 4/1971 | Siver | 251/329 |
| 3,601,358 | 8/1971 | Cruse | 251/144 |
| 3,746,375 | 7/1973 | Funk | 285/189 |
| 3,894,757 | 7/1975 | Best | 285/189 |
| 3,918,678 | 11/1975 | Rechtsteiner | 251/144 |
| 3,993,285 | 11/1976 | Conley | 251/329 |

FOREIGN PATENT DOCUMENTS 471417 9/1937 United Kingdom ...................... 251/329

Primary Examiner—William R. Cline
Assistant Examiner—H. Jay Spiegel

[57] ABSTRACT

A forged steel male end valve provided with a new and improved body with a centering end ring adapted for butt welding as for instance with respect to a tank or pipe, said body being greatly enlarged in diameter, compared to the bore of the body, adjacent to the centering ring, and tapering gradually downwardly from a maximum to a minimum cross-sectional area intermediate the ends of the body. The valve body as a whole is greatly elongated to provide space for application of insulation. The valve body includes in addition to the enlarged end portion, a portion of generally uniform cross-section, extending from the gradually tapered portion, the uniform portion being preferably of equal or greater length than the downwardly tapered portion. Thereafter the outer diameter of the body may e.g. remain uniform for a short distance and then it slopes gradually downwardly to the portion of uniform diameter. A space is provided between the abruptly upwardly sloping portion and the receiving opening of the tank or pipe in which the centering ring is located, which space may be used to accommodate welding material for a butt weld. The elongated body portion of a reduced diameter beyond the portion of maximum thickness provides space for the application of insulation material if desired.

1 Claim, 7 Drawing Figures

MALE ENDED VALVE

BACKGROUND OF THE INVENTION

In the past, valves of the present nature and for the present usages as for instance in refineries, chemical plants, etc., have been made with insufficient strength to resist damage from harmful vibrations and bending under conditions of unintended usages thereof as ladders etc., and these prior art valves had to be gusseted, i.e. a brace had to be welded thereon and to the tank or other part that the valve body is connected to, in order to last a reasonable time under conditions of stress, vibration and rough and unauthorized usages, etc. This invention obviates the usual gusseting and thereby presents a savings in cost as well as an improvement in resisting stresses, vibrations, and eliminating additional reinforcements, reducing the number of welds required, etc.

In addition, present insulation proposals for tanks of the kind for which this valve is used have greatly increased, and the present valve has a greatly elongated body from the point of connection to the tank, etc., to the bonnet, so that more insulation can be provided with no modification of the new valve.

Valves of the prior art are also apt to corrode easily through lack of sufficient section and the present valve overcomes this difficulty.

DISCUSSION OF THE PRIOR ART

Applicant is unaware of any prior art which conflicts with the present invention which obviates the difficulties in the prior art enumerated.

SUMMARY OF THE INVENTION

As an example of a valve of the kind described, which may be made with bores of different diameters, the same is provided with an elongated body at one end of which is a centering ring which provides greater ease and strength for welding as for instance at the edge of a hole in a tank or to a pipe. Although the bore is uniform, the outside diameter of the body is at a maximum shortly inwardly of the centering ring, being tapered in this regard in order to provide a correct welding angle. The maximum diameter may be for instance more than twice the bore of the body in certain diameters; and from the maximum diameter it tapers downwardly for a portion of the length thereof, to a uniform section at another portion of the body, and then it may be slightly enlarged in the area of the valve actuator.

It is preferred that a gate valve be used of a more or less known construction and seating rings and the like, and at the side of the body opposite the male end it may be provided with interior screw threads or the like for connection to hoses or pipes as will be clear to those skilled in the art.

The specially contoured construction of the male end valve body provides adequate strength, resisting harmful stresses and vibrations; eliminates any need for gusseting or additional reinforcement as is now necessary, and also eliminates some welding and is much easier to put into service. For instance, the new valve body can be centered in a hole by the centering ring, tack welded in place, and then fillet welded with no need of holding the valve while the fillet weld is finished.

Also it has sufficient length for increased insulation thicknesses according to modern day energy saving requirements, and the centering ring and adjacent construction of the body provide greater ease in welding, and permits the valve to be oriented at any angle through a 360° circle. The length of the centering ring provides its own back-up ring and is of sufficient length to facilitate welding to almost any size pipe where it is to be welded to pipe.

Furthermore, the novel male end body of the present valve provides adequate corrosion allowance taking care of today's highly corrosive media, and welds being reduced in number, corrosion resistance is improved. Further advantage lies in reduced field service and inspection costs due to reduced amount of welded joints during installation fabrication.

PREFERRED EMBODIMENT OF THE INVENTION

Figure 1:
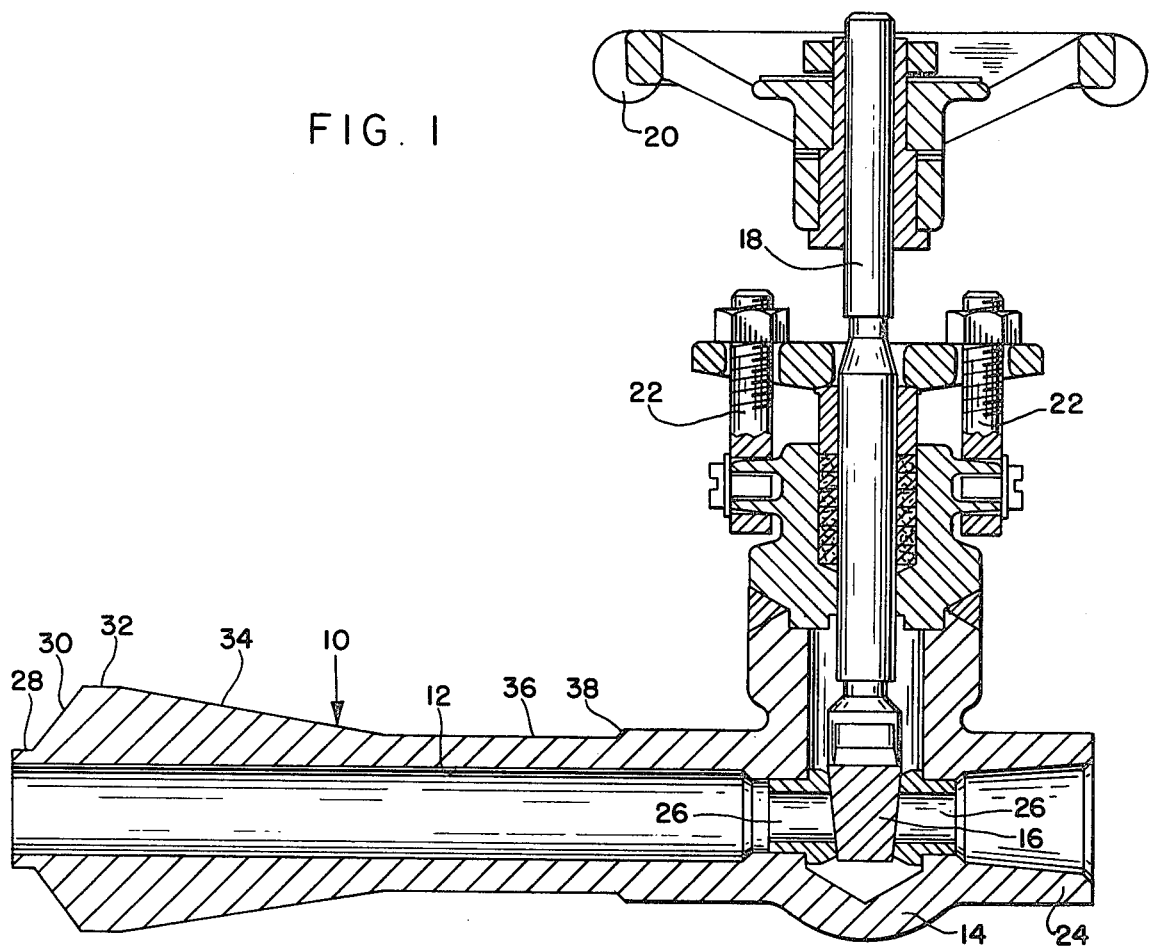
FIG. 1 is a cross sectional view illustrating the new valve and the contour of the body thereof.

In the present case a forged steel valve body is generally indicated at 10. This body has generally cylindrical uniform bore 12 leading to a slight enlargement 14 for the reception of the gate valve wedge 16 operated by a stem 18 having e.g. a rotating handle 20. In this particular case the stem assembly is threaded to operate the gate wedge and it is provided with the bolts and the like at 22 for a purpose which will be clear to those skilled in the art.

At the opposite end of the body there is a female end 24 which may be threaded as usual and the gate wedge cooperates with seat rings 26,26 to open or close the valve.

The body 10 is relatively elongated and for a one inch valve for instance will have an overall length e.g. of about $9\frac{1}{2}$ inches, and for a $\frac{1}{2}$ inch valve will have an overall length e.g. of about $7\frac{3}{4}$ inches, whereas in the one inch valve the length from the centering ring which is indicated at 28 to the axis of the valve stem is e.g. about $7\frac{1}{2}$ inches and $6\frac{1}{8}$ inches for the $\frac{1}{2}$ inch valve, it being recognized that any other sizes may be made as required but in general the proportions will remain more or less as stated.

The centering ring 28 is adapted to enter the end of a pipe or a hole in a tank, and provides its own backing-up ring and is of sufficient length to facilitate welding with respect to the required hole or different sizes of pipe. With the new valve in centered position, it can be tack welded to hold it, and without assistance the main weld can be made easily.

The welding action is made easier and stronger by the conical surface indicated at 30 providing a flare extending outwardly e.g. at a $37\frac{1}{2}°$ angle, to the maximum diameter of the body itself, which is indicated by the reference numeral 32. The diameter of the body at this point is greater than twice the bore in most cases and provides an extremely great strength for the entire valve. From the area 32 which is generally cylincrical, the valve body tapers downwardly and inwardly along the conical surface 34 to a minimum diameter at 36, the minimum diameter 36 extending toward the bonnet for a length which may be less than the length of the tapered portion 34 and the conical surface 30. Preferably at a point 38 the wall thickens to a small extent to better support the bonnet, valve stem assembly, etc.

As an example, the diameter of the handle 20 may be about 4 inches, which in the case of a $\frac{1}{2}$ inch valve is about one half the overall length of the valve body; and in the case of a one inch valve it is less than one half the length of the valve body, but in any event, for a comparison of the length of the valve body and the widest part of the operating portion of the valve, it will be seen that the ratio of the same is approximately 2 to 1, which is greater than the valves of the prior art and provides for the easy application of insulation to a tank for instance between the centering ring 28 and the most adjacent portion of the valve handle, than is possible with valves of the prior art used for similar purposes.

Figure 2:
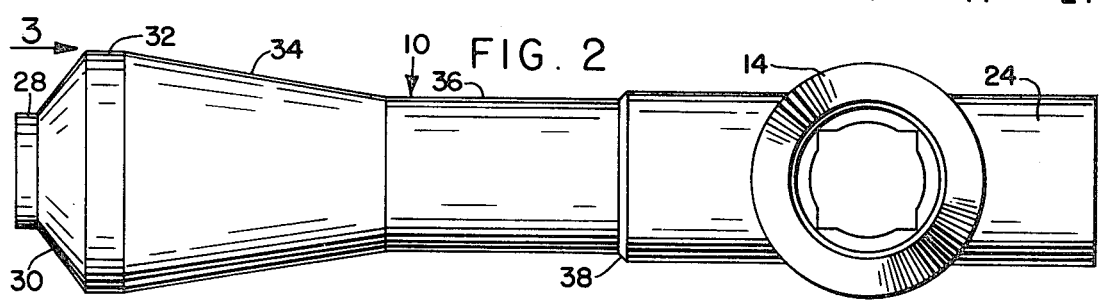
FIG. 2 is a plan view of the body per se.
Figure 3:
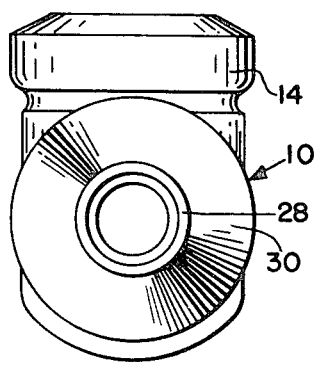
FIG. 3 is an end view looking in the direction of arrow 3 in FIG. 2.

It is to be noted that except for the bonnet, the valve body has cylindrical or conical surfaces of revolution at all points and this is clearly shown in FIGS. 2 and 3.

Figure 4:
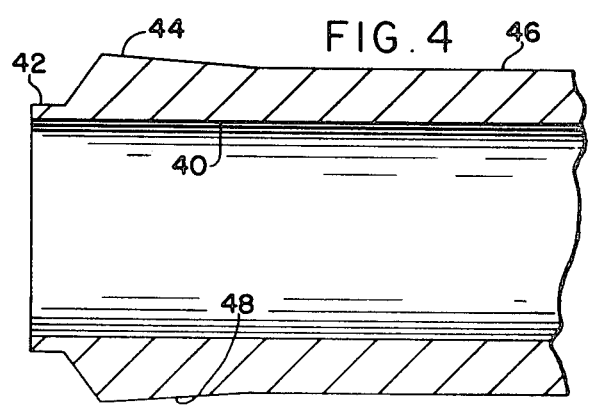
FIG. 4 is a section of a modified body male end.

It has been found that the smaller the diameter of the valve bore the greater is the difference between the overall diameter of the body at 32 and the bore of the valve. Where increasingly large valves are made, the wall of the body may be somewhat less, as shown in FIG. 4 because of the fact that the greater the bore of the valve the more metal is involved in the enlargement 32 and the taper 34, so that in order to retain the required strength for any particular diameter of valve bore, there should be a greater metal ratio with reference to the diameter of the valve bore than in the larger sizes. Also the length of the taper may vary depending upon the design of the valve, size, and the use to which it is to be put.

See for instance FIG. 4, where the valve is e.g. a $1\frac{1}{2}$ inch valve, see the bore at 40. The centering ring is indicated at 42, the maximum diameter at 44 and the minimum diameter at 46. In this case the taper at 48 is much less in length relative to the diameter at 46 than is the case in FIG. 1, which has a lesser bore.

Figure 5:
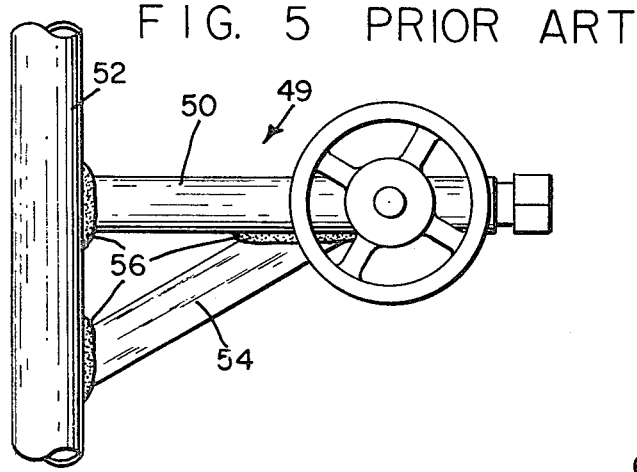
FIG. 5 is a view illustrating a prior art valve installation.
Figure 6:
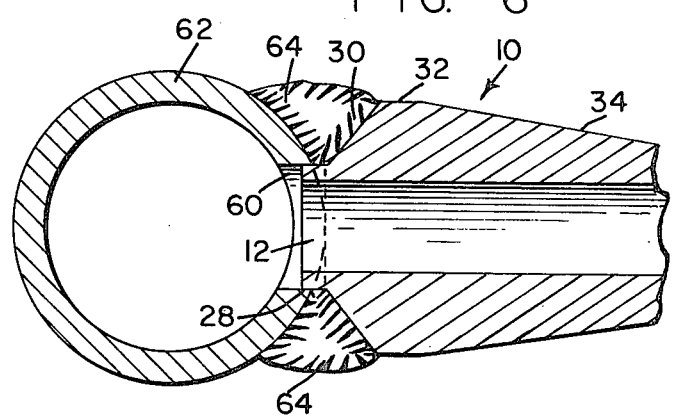
FIG. 6 is a fragmentary section of the valve body of the present invention applied to a small diameter pipe.
Figure 7:
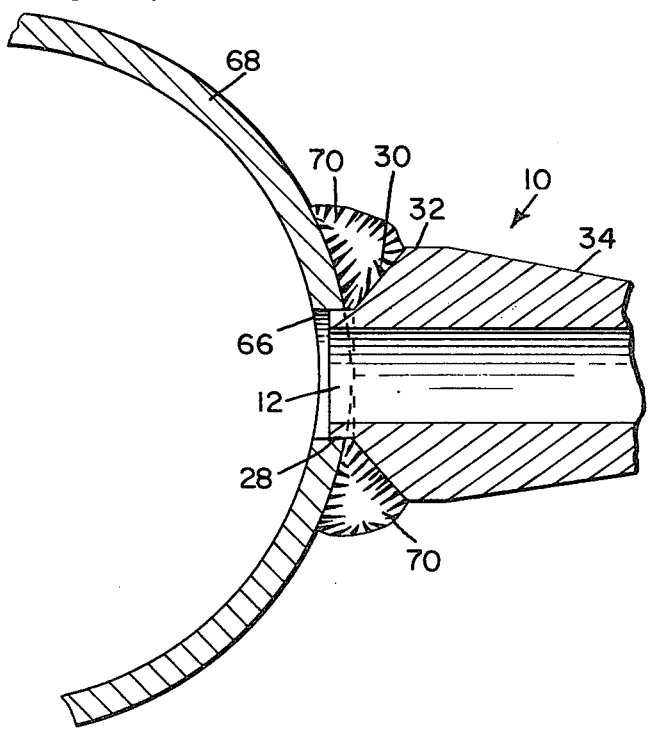
FIG. 7 is a view similar to FIG. 6 showing the valve body applied to a large diameter pipe or tank.

The advantages of the present invention can best be seen in FIGS. 5–7.

FIG. 5 shows a prior art valve generally indicated by the reference numeral 49 and comprises a male end valve body 50 connected to a pipe 52. A gusset or brace 54 extends from the pipe 52 from a point spaced from the connection between the pipe and valve body to a point adjacent the valve stem assembly. Welds 56 hold the valve body 50 and gusset 54 in place.

The prior art valve not having the enlargement at 30, 32, must be held in place by the operator until the weld between body 50 and pipe 52 is substantially completed. The present valve can be tack welded in place and then completely welded with much greater facility and speed. The welds 56 are all external failing to have the generally V-shaped reception areas of the present invention.

Referring to FIGS. 6 and 7, the valve of the present invention is shown applied to a small diameter pipe as is shown in FIG. 6 or a large diameter pipe or tank as shown in FIG. 7. The small diameter pipe 62 shown in FIG. 6 has an opening 60 for receiving the centering ring 28 of the body which is held in place by means of welding 64. A V-shaped annular groove is formed between the outer surface of the pipe and the conical surface 30 of the valve body which is filled with welding material to form a very strong and stable connection which eliminates the need for gusseting or bracing.

FIG. 7 shows a large diameter pipe or tank 68 provided with an opening 66 for receiving the centering ring 28. The V-shaped annular groove formed between the outer surface of tank 68 and conical surface 39 is filled with welding material 70 to hold the valve body 10 securely in position.

The welding operation in the present case is done more accurately as well as faster, and two welds of the prior art are eliminated, thus reducing corrosion.

The greater wall thickness and taper near the weld joint provides for additional strength to resist excessive vibration, pressure surges, handling damage, etc., and more uniform blending of weld deposited material for improved structural support and improve "damping" of stresses created by bending moments. The centering ring eliminates problems associated with field installation i.e., positioning, fixturing and provides integral backing. The valve can be positioned at any angle during installation and facilitates welding to most pipe sizes. The shape of the valve end eliminates the need for special gussetting or additional weld reinforcement, see FIG. 3. Increased length of the valve end permits application of greater insulation thicknesses without loss in strength due to greater bending moments. The invention reduces likelihood of concentration or build-up of contaminants or corrosives. Field service inspection costs are reduced due to reduced amount of welded joints during installation fabrication.

I claim:

1. In a valve having a one piece valve body consisting of a main housing section defining a valve chamber and supporting a valve bonnet, with male and female members extending longitudinally in opposite directions from the housing section, said male and female members being provided with axial bores communicating with the valve chamber, and the male member being adapted to be butt welded to a support surface with its bore in communication with an opening in said surface, the improvement comprising:

a cylindrical axially protruding centering ring at the distal end of said male member, said centering ring being adapted to enter into the opening in the support surface and to cooperate therewith in locating the valve, said male member having a first portion with a truncated conical outer surface leading from said centering ring to a second portion having an outer diameter greater than the outer diameter of said centering ring, said second portion in turn being connected by a third portion having a truncated conical outer surface to a fourth portion, said fourth portion being joined to said housing section and having a maximum outer diameter smaller than that of said second portion, the bore extending through the centering ring and at least said first, second and third portions having a uniform diameter, the circle defining the intersection between said centering ring and said first portion being spaced from said support surface with said centering ring being at least partially within said surface opening, when said centering ring is butt welded to said support surface.

* * * * *